United States Patent [19]
White

[11] Patent Number: 5,722,776
[45] Date of Patent: Mar. 3, 1998

[54] SHIPPING BEARING

[75] Inventor: Jeffrey Neil White, Hopkinsville, Ky.

[73] Assignee: White Hydraulics Inc, Hopkinsville, Ky.

[21] Appl. No.: 626,670

[22] Filed: Apr. 1, 1996

[51] Int. Cl.⁶ ............................................. F16C 33/44
[52] U.S. Cl. .................................. 384/380; 384/284
[58] Field of Search .............................. 384/380, 284, 384/396, 285, 283, 397

[56] References Cited

U.S. PATENT DOCUMENTS 3,841,716  10/1974  Webber et al. ........................ 384/396
4,285,643  8/1981  White ................................... 418/61 B Primary Examiner—Lenard A. Footland
Attorney, Agent, or Firm—Lightbody & Lucas

[57] ABSTRACT

A matt knurl for a sleeve bearing is utilized in order to provide a reservoir of lubricant, thus to eliminate the gauling and physical damage to sleeve bearings during the non-operational shipment thereof.

29 Claims, 3 Drawing Sheets

SHIPPING BEARING

This invention relates to a bearing for devices having sleeve bearings, devices such as hydraulic motors.

BACKGROUND OF THE INVENTION

Sleeve bearings are useful for rotatively supporting a shaft to a surrounding housing. Typically, these bearings are provided by positioning a smooth circumferential shaft surface within a closely surrounding smooth bore in the housing, one or both of which rotate in respect to the other. Also typically, these surfaces extend for a certain axial length that optimizes longevity against other factors such as friction, parasitic pressure loss, etc. The White Hydraulics Model RS is a hydraulic device incorporating such bearings at the front and back of an enlarged valving section.

Sleeve bearings are serviceable—providing a good balance of cost vs. functionality. A major reason for this in hydraulic devices is the lubrication that occurs incidental to the necessary manufacturing clearances and non-productive fluid leakage.

However, when not in service, the very bearing surfaces that function so well in service can gaul and wear. This typically occurs during shipment of a bare unit (such as a hydraulic motor from a manufacturer to a user), during movement of a non-operational unit (such as incidental to transport of a non-rotating cement mixer between jobs), or otherwise. This gaul and wear can be so severe that the device can lock up and bind, at the time or in subsequent operation. This is irrespective of any later interconnection to a fluid source. Thus, paradoxically, it is possible to damage a sleeve bearing device quicker and more thoroughly during the time of shipment of a new unused device or during periods of non-use of an installed device than during a longer time of operational use.

OBJECTS OF THE INVENTION

It is an object of this invention to reduce non-operational wear in sleeve bearing devices.

It is an object of this invention to increase the operational life of sleeve bearing devices.

It is an object of this invention to reduce the gauling of sleeve bearing devices.

It is still an object of this increase the shipping and movability capabilities of sleeve bearing devices.

It is another object of this invention to expand the usability of sleeve bearing devices.

Other objects and a more complete understanding of the invention may be had by referring to the following drawings in which:

IDENTIFICATION OF DRAWINGS

DETAILED DESCRIPTION OF THE INVENTION

Figure 1:
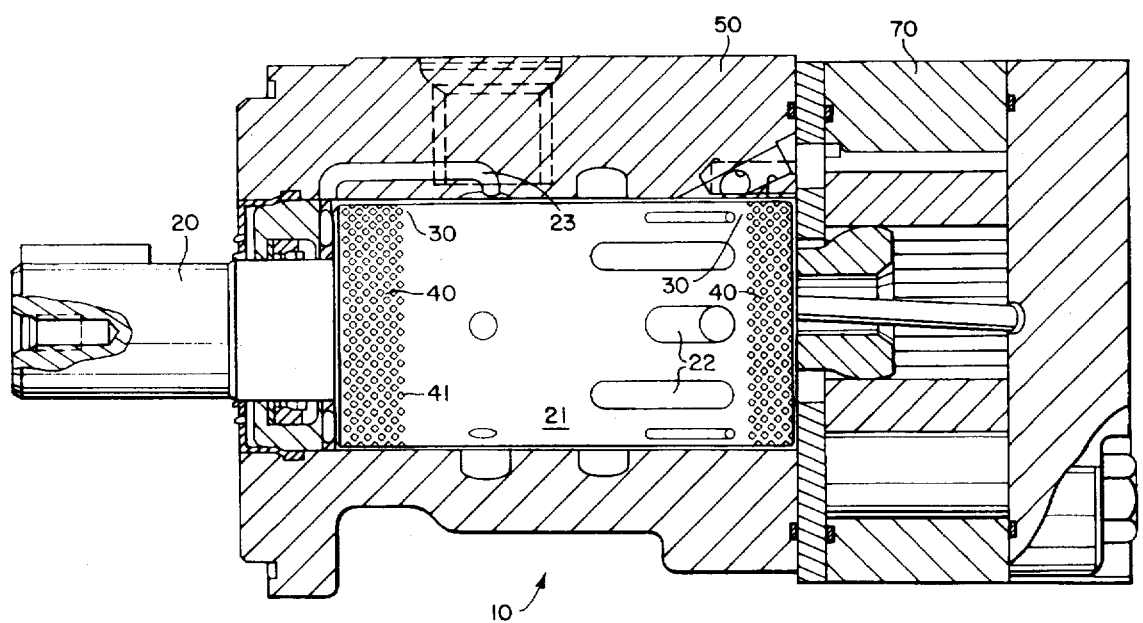
FIG. 1 is a cross-sectional view of a hydraulic motor having a rotating shaft incorporating the invention of the application.
Figure 2:
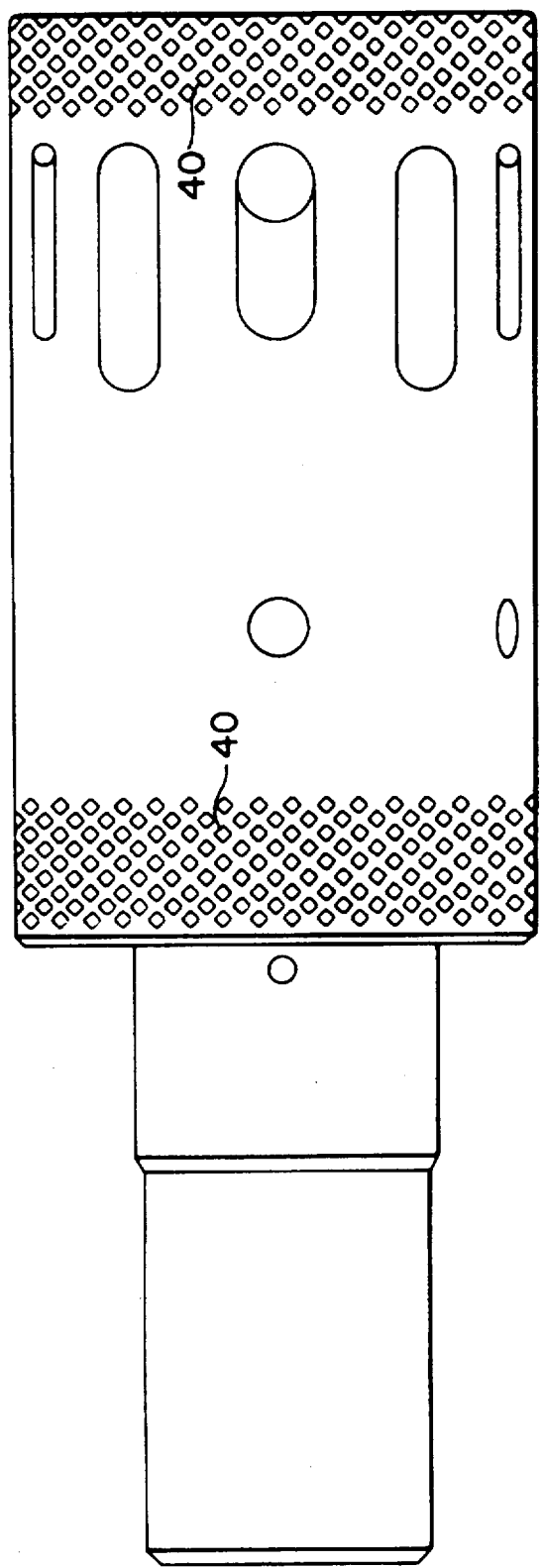
FIG. 2 is a lateral view of a simple shaft similar to that of FIG. 1.

This invention relates to an improved bearing modification for a sleeve bearing. The invention will be described in a preferred embodiment of a hydraulic gerotor motor. The basic gerotor motor is the White Hydraulics Model RS motor such as that commercially available and described in one form in U.S. Pat. No. 4,285,643—Rotary Fluid Pressure Device, the contents of which are incorporated by reference.

The gerotor motor 10 includes a shaft 20, a housing 50 and a hydraulic structure 70.

The shaft 20 is one member of the sleeve bearing. In the embodiment disclosed, it is also the power generation/access means for the gerotor motor 10 (depending on if the device is operated as a motor or pump). To accomplish this function, it is necessary that such shaft 20 be rotatively mounted to the housing 50. One type of method of accomplishing this is a sleeve bearing 30 (and a modification of this is the subject of the present application).

A sleeve bearing is a relatively straight forward type of device wherein two closely spaced circular surfaces rotatively support one member in respect to another member. It is possible to rotate the inner member in respect to the fixed outer member, the outer member in respect to the fixed inner members, or a combination of the above (the bearing itself does not care). The key to the type of bearing is the circular planar rotating, typically lubricated, contact between two immediately adjoining surfaces. The bearing, being self forming integral with the surfaces, is typically an inexpensive, cost effective bearing. However, the sleeve bearing also has disadvantages, such as the need to maintain clearances, friction losses, shorter life and others, in contrast with ball or needle bearings.

One additional problem of sleeve bearings that here-to-fore has been relatively ignored is that a sleeve bearing also has non-operational problems such as gauling, scoring and excessive wear. Typically, this can occur during movement of a non-operating device incorporating a sleeve bearing; for example, during the shipment of a newly manufactured motor to a distributor. Due to the tolerances within the device (and incidental rotation), the sleeve bearing 20 is subject to movement between the two adjoining circular surfaces forming same. Additional example—returning a thresher having a hydraulic motor for powering the then unused threshing mechanism to the barn over five miles of unpaved highway. As the hydraulic device is not then pressurized, the sleeve bearing is relatively unlubricated and uncooled at this time. For this reason, the two planar surfaces that define the bearing interact with each other by physically rubbing against each other. This rubbing, typically being located at only certain limited positions, causes physical wear in the bearing at these locations. This uneven wear compromises later functional operation of the device by damaging the contact uniformity of the sleeve bearing. In certain cases the physical gauling, scoring and other types of damage can severely shorten the operational longevity of the device, not to mention the operational efficiency of the device. In extreme cases the hydraulic device can be rendered non-operational by the physical damage. Subsequent damage can also occur due to the particles from the gauling.

The present invention is a knurled surface 40 for at least part of one surface of the sleeve bearing 30. This knurled surface 40 provides a reservoir for lubricant at the location of the sleeve bearing 30, thus ameliorating the above identified problem with sleeve bearings.

Figure 3:
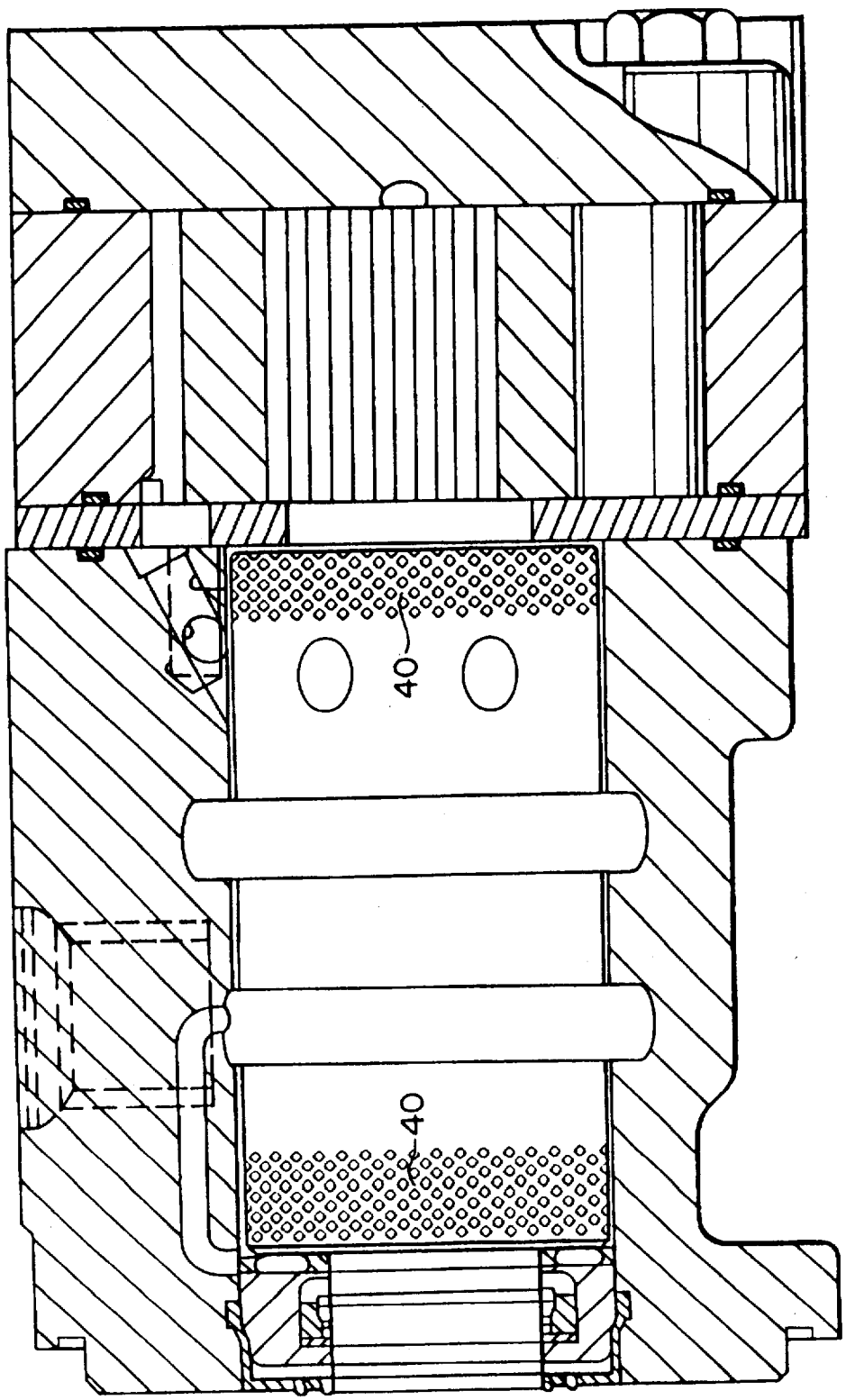
FIG. 3 is a lateral view of an alternative embodiment of the invention for use in the same type of gerotor motor.

In the preferred embodiment disclosed, a modification to the previously set forth White Model RS Rotary Fluid Pressure Device, the knurled surface is provided by compressing a series of small square dimples, a matt knurl, into the circumference of one member of the sleeve bearing 30 so as to provide for a source of oil to lubricate the sleeve bearing when there is no rotation. In the particular embodiment disclosed, these matt knurls 41 are formed into either the shaft (FIG. 1) or the body of the surface of the hydraulic device (the body as shown in FIG. 3) in order to retain lubrication of these critical locations. A combination thereof is also possible.

In the particular embodiment disclosed in FIG. 1 the enlarged section 21 of the shaft 20 extends substantially four inches long with a 0.35 matt knurl on the inner end circumference and a substantially 0.45 matt knurl on the more critical outer end circumference (the outer end is subject to additional forces based on the loading of the shaft 20 perpendicular to the axis thereof while the inner surface is not subject to the same extent of loading—hence the outer section extends further). Each individual dimple 41 has a side length of substantially 0.05 inches with a depth of substantially 0.01 inches. In this respect, please note that the number and pattern of the dimples 41 would be selected in view of the actual proposed problem which could occur with the sleeve bearing. In specific, tighter tolerances for the sleeve bearing (i.e. the lower the clearance is between the adjoining circular members) and the longer that the device will be subjected to relatively unlubricated loading creates a need for a greater reservoir of lubrication oil at this point. This greater reservoir could be provided by making the dimples 41 deeper, thus increasing the volume of oil available for a given number of dimples, or it could be increased by extended the number of dimples over a greater area than otherwise—contrast for example the opposite ends of the shaft 20 in the preferred embodiment of FIG. 1. It could also be provided by providing matt knurls on both members of the sleeve bearing, for example by installing the shaft 20 of FIG. 1 into the body of figure 3. In this respect, also note that in general a smaller number of deeper dimples would compromise the actual performance of the sleeve bearing less than a greater number of shallower dimples. Further, the same is true the more spread out the dimples are, including being spread out over both surfaces.

In addition to the above, there are other considerations as well. For example, the viscosity of the oil and the type of movement the device will be subject to also has to be considered. For example, the knurled section 40 at the inner end of the shaft 20 is near to the alternating valving openings 22 for the device 10. For this reason, the knurled section at this location somewhat compromises the hydraulic operating efficiency of the device 10 by slightly reducing the sealing between the alternating openings, in addition to increasing incidental bypass leakage about the end of the shaft 20. This slight loss in efficiency, however, is compensated for by the longer life of the unit due to reduced non-operational gauling as well as increased operational lubrication of the sleeve bearing. Additional example, the matt knurls reduce the contact surface area of the sleeve bearing. This surface area must not be reduced to such an extent that there is an insufficient area for acceptable operational service bearing life.

Modifications to the invention are also possible. For example, the devices of the figures all show separate discreet dimples acting as individual reservoirs spread out over the entire circumference of the effected members. This is preferred in that it reduces the migration of the oil migrating within the device in contrast, for example, to interconnecting channels—i.e. a series of criss-crossing grooves, a knurl, instead of the discrete dimple matt knurl shown. In certain applications, this would be acceptable. An example would be as if the device was not subject to operational efficiency losses and thus the prevention of leakage was not warranted from a cost benefit analysis. An example of this would be the head end of the shaft 20 should the bearing lubrication loop 23 be eliminated.

The modifications being made without departing from the invention as hereinafter claimed.

What is claimed is:

1. In a device having a shaft using at least one sleeve bearing about its circumference within a housing, the shaft having a length within the housing, the device having areas containing a residue of unpressurized lubricant, the improvement of a knurl, said knurl being located in one of the shaft or housing at least partially overlapping the location of the sleeve bearing, said knurl having a length, said length of said knurl being less than the length of the shaft within the housing, and at least some of the lubricant being located in said knurl so as to prevent galling of the shaft and sleeve bearing joint.

2. In a device having a shaft using at least one sleeve bearing about its circumference within a housing, the device having areas containing a residue of unpressurized lubricant, the shaft having openings in a fluidic operational connection to openings in the housing at a location spaced from an end of such shaft to actively selectively valve the device causing rotary movement of the shaft, the improvement of a knurl, said knurl being located in one of the shaft or housing at least partially overlapping the location of the sleeve bearing, and characterized in that said knurl does not overlap the fluidic operational connection location, and at least some of the lubricant being located in said knurl so as to prevent galling of the sleeve bearing.

3. The device of claim 1 characterized by the addition of a ring, said ring being connected to the drive shaft between the drive shaft and the sleeve bearing and said knurl being in said ring.

4. The device of claim 1 characterized in that the sleeve bearing overlaps substantially all of said knurl.

5. The device of claim 1 characterized in that said knurl is located in the drive shaft.

6. The device of claim 1 wherein the shaft has a second sleeve bearing within a housing and characterized by the addition of a second knurl, said second knurl being located in one of the shaft or housing at least partially overlapping the location of the second sleeve bearing, said second knurl being spaced from said knurl in respect to the length of the shaft within the housing, and at least some of the lubricant being located in said second knurl so as to prevent the galling of the second sleeve bearing.

7. The device of claim 6 characterized in that the shaft has fluidic openings and characterized in that said second knurl is spaced from the fluidic openings in the shaft.

8. The device of claim 7 characterized in that said knurl is on the opposite side of the fluidic openings in the shaft from said second knurl.

9. The device of claim 6 characterized in that said second knurl is a series of small discrete dimples.

10. The device of claim 6 characterized in that the shaft is hollow and has an outside surface, the shaft having openings to the outside surface, and said second knurl being spaced from said openings.

11. The device of claim 10 characterized by the addition of openings in the housing, said openings in the housing cooperating with said openings in the shaft to actively selectively valve the device.

12. The device of claim 1 characterized in that the shaft has fluidic openings and characterized in that said knurl is spaced from the fluidic openings in the shaft.

13. The device of claim 1 characterized in that said knurl is a series of small discrete dimples.

14. The device of claim 1 characterized in that the shaft is hollow and has an outside surface, the shaft having openings to the outside surface, and said knurl being spaced from said openings.

15. The device of claim 14 characterized by the addition of openings in the housing, said openings in the housing cooperating with said openings in the shaft to actively selectively valve the device.

16. In a rotary hydraulic power device having a drive shaft using at least one sleeve bearing about its circumference within a housing, the drive shaft having a length within the housing, the power device having areas containing a residue of unpressurized hydraulic fluid, the improvement of a matt knurl of a series of small discrete dimples, said matt knurl being located in one of the shaft or housing at least partially overlapping the location of the sleeve bearing, said matt knurl having a length, said length of said matt knurl being less than the length of the shaft within the housing, and at least some of the unpressurized fluid being located in said matt knurl so as to prevent galling of the sleeve bearing.

17. The hydraulic pressure device of claim 16 characterized by the addition of a ring, said ring being connected to the drive shaft between the drive shaft and the sleeve bearing and said matt knurl being in said ring.

18. The hydraulic power device of claim 16 wherein the drive shaft has a second sleeve bearing within a housing and characterized by the addition of a second matt knurl of a series of small discrete dimples, said second matt knurl being located in one of the shaft or housing at least partially overlapping the location of the second sleeve bearing, said second matt knurl being spaced from said matt knurl in respect to the length of the drive shaft within the housing, and at least some of the unpressurized fluid being located in said second matt knurl so as to prevent galling of the second sleeve bearing.

19. The hydraulic pressure device of claim 16 characterized in that the sleeve bearing overlaps substantially all of said matt knurl.

20. The hydraulic pressure device of claim 16 characterized in that said matt knurl is located in the drive shaft.

21. In a rotary hydraulic power device having a drive shaft using at least one sleeve bearing about its circumference within a housing, the power device having areas containing a residue of unpressurized hydraulic fluid, the drive shaft having openings in a fluidic operational connection to openings in the housing at a location spaced from an end of such shaft to actively selectively valve such hydraulic power device, the improvement of a matt knurl of a series of small discrete dimples, said matt knurl being located in one of the shaft or housing at least partially overlapping the location of the sleeve bearing, said matt knurl not overlapping the fluidic operational connection location, and at least some of the unpressurized fluid being located in said matt knurl so as to prevent galling of the sleeve bearing.

22. In a hydraulic motor having a shaft using at least one sleeve bearing about its circumference within a housing, the shaft being selectively connected to a power generating structure having an operating fluid between a pressure and return interconnection, the device having areas containing a residue of unpressurized lubricant during non-operation, such lubricant being the residue of the operation fluid for the hydraulic motor, the shaft having openings in a fluidic operational connection to openings in the housing at a location spaced from an end of such shaft to actively selectively valve the device causing rotary movement of the shaft, the improvement of a knurl, said knurl being located in one of the shaft or housing at least partially overlapping the location of the sleeve bearing, the sleeve bearing being located substantially at the same end of the shaft as the fluidic operational connection location, said knurl not overlapping the fluidic operational connection location, and at least some of the lubricant being located in said knurl so as to prevent galling of the sleeve bearing.

23. The device of claim 22 wherein the shaft has a length in respect to the housing and a second sleeve bearing within a housing and characterized by the addition of a second knurl, said second knurl being located in one of the shaft or housing at least partially overlapping the location of the second sleeve bearing, said second knurl being spaced from said knurl in respect to the length of the shaft within the housing, and at least some of the lubricant being located in said second knurl so as to prevent the galling of the shaft and second sleeve bearing joint.

24. The device of claim 22 characterized in that the sleeve bearing overlaps substantially all of said knurl.

25. The device of claim 22 characterized in that said knurl is located in the drive shaft.

26. The device of claim 25 characterized by the addition of a ring, said ring being connected to the drive shaft between the drive shaft and the sleeve bearing and said knurl being in said ring.

27. In a rotary hydraulic motor having a drive shaft using at least one sleeve bearing about its circumference within a housing, the shaft being selectively connected to a power generating structure having an operating fluid between pressure and return interconnection, the power device having areas containing a residue of unpressurized hydraulic fluid during non-operation, such fluid being the residue of the operational fluid for the hydraulic motor, the drive shaft having openings in a fluidic operational connection to openings in the housing at a location spaced from an end of such shaft to actively selectively valve such hydraulic power device, the improvement of a matt knurl of a series of small discrete dimples, said matt knurl being located in one of the shaft or housing at least partially overlapping the location of the sleeve bearing, said matt knurl not overlapping the fluidic operational connection location, and at least some of the unpressurized operational fluid being located in said matt knurl so as to prevent galling of the sleeve bearing.

28. The hydraulic power device of claim 27 wherein the drive shaft has a length within the housing and a second sleeve bearing within a housing and characterized by the addition of a second matt knurl of a series of small discrete dimples, said second matt knurl being located in one of the shaft or housing at least partially overlapping the location of the second sleeve bearing, said second matt knurl being spaced from said matt knurl in respect to the length of the housing, and at least some of the unpressurized operational fluid being located in said second matt knurl so as to prevent galling of the second sleeve bearing.

29. The hydraulic pressure device of claim 27 characterized in that the sleeve bearing overlaps substantially all of said matt knurl.

* * * * *